United States Patent [19]

Jennings et al.

[11] 4,400,591
[45] Aug. 23, 1983

[54] SIMULATED SPACE HELMET

[76] Inventors: Daniel E. Jennings, 9601 Glenn Green, Dallas, Tex. 75217; Richard S. Woodling, 103 Pine St., Keene, Tex. 76059

[21] Appl. No.: 284,585

[22] Filed: Jul. 17, 1981

[51] Int. Cl.$^3$ .............................................. H04M 1/05
[52] U.S. Cl. ........................... 179/156 R; 179/156 A; 2/424; 46/227
[58] Field of Search ......... 362/84; 179/156 R, 156 A, 179/105, 1 VC, 1 SP, 121 R, 137, 182, 1 UW, 1 VE; 2/2.1 A, 2.1 R, 6, 410, 204, 205, 425; 331/40, 78, 106, 170, 177 V, 36 R, 179; 330/42, 16, 20, 21; 174/68 R; 340/815.11, 384.5, 815.81, 753, 754, 148; 307/271, 529, 15; 46/227, 232; 84/1.22

[56] References Cited

U.S. PATENT DOCUMENTS

| | | | |
|---|---|---|---|
| 2,403,245 | 7/1946 | Slaymaker | 328/15 |
| 3,180,333 | 4/1965 | Lewis | 179/156 R |
| 3,258,534 | 6/1966 | Goldsworthy | 179/156 A |
| 3,309,691 | 5/1965 | Bonanno | 340/321 |
| 3,337,841 | 8/1967 | Wainwright et al. | 179/1 UW |
| 3,435,556 | 4/1969 | Clarke | 46/227 |
| 3,514,785 | 6/1970 | Smith | 2/2.1 |
| 3,963,917 | 6/1976 | Romano | 240/60 |
| 4,107,462 | 8/1978 | Asija | 179/1 VC |
| 4,154,981 | 5/1979 | Dewberry et al. | 179/1 UW |
| 4,231,079 | 10/1980 | Heminover | 362/106 |

OTHER PUBLICATIONS

"Walkie Talkie Helmet Set", p. 98, Neiman-Marcus Christmas Book, 1975.
"Star Force Transceiver", Operating Instructions Sheet, Kingsford, LTD.
"The Gor Space Helmet", Edmund Scientific Catalog.

Primary Examiner—G. Z. Rubinson
Assistant Examiner—Danita R. Byrd
Attorney, Agent, or Firm—Dennis T. Griggs

[57] ABSTRACT

A helmet having a built-in modulator and amplifier for voice alteration and projection is disclosed. The helmet includes a forwardly projecting nose housing having a viewing shield and an array of light emitting diodes. The light emitting diodes are coupled to the amplifier through a driver in which selected groups of the diodes are illuminated according to the intensity of the audio signal delivered by the amplifier. A loud speaker is mounted within the nose housing and is enclosed by a sidewall baffle. A microphone is mounted on the outside of the baffle and is connected to an audio alteration unit within the enclosure which includes an analog multiplier, a sine wave oscillator and an audio amplifier. The multiplier has an audio output corresponding to the product of the voice signal produced by the microphone and the sine wave oscillator signal. This produces a modulation effect which simulates an alien sound.

1 Claim, 3 Drawing Figures

SIMULATED SPACE HELMET

BACKGROUND OF THE INVENTION

1. Field of the Invention

This invention relates generally to helmets and in particular to toy helmets having illumination and audio devices for simulating special effects.

2. Description of the Prior Art

In recent years, a great deal of interest has developed in toys relating to space travel and space adventures. Space characters, including alien personalities, have acquired widespread popularity in response to books, television presentations and motion pictures portraying adventures in space. This entertainment area has widespread appeal to both children and adults. Children, in particular, derive a great deal of satisfaction by imitating their screen and video heroes. Accordingly, simulated space equipment toys have become available to be played with or worn by children as they pretend and enact imaginary space adventures.

SUMMARY OF THE INVENTION

According to the present invention, a toy space helmet is provided which has a built-in voice modulator and amplifier for altering and projecting a person's voice, and having lights modulated by the voice signal to simulate alien effects. The helmet has a head covering portion and a forwardly projecting nose housing with a viewing shield connected between the head covering portion and the nose housing. The nose housing includes a loud speaker port opening and has a sidewall baffle portion which encloses the housing behind the port opening. A loud speaker and a voice alteration unit are mounted within the enclosure and a microphone for producing an audio signal is mounted on the baffle externally of the enclosure. A battery pack is mounted in the rear of the head covering portion and is electrically coupled to the audio alteration unit for providing operating power.

Voice alteration is obtained by multiplying the audio signal produced by the microphone with a sine wave signal produced by an oscillator. The product of the audio signal and the sine wave signal is fed to the speaker through an audio amplifier. According to a preferred embodiment, a light emitting diode array is mounted on the helmet with combinations of the light emitting diodes receiving operating power from the voice alteration unit. Preferably, the number of light emitting diodes energized is a function of the voice signal intensity.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

DETAILED DESCRIPTION OF THE PREFERRED EMBODIMENT

Figure 1:
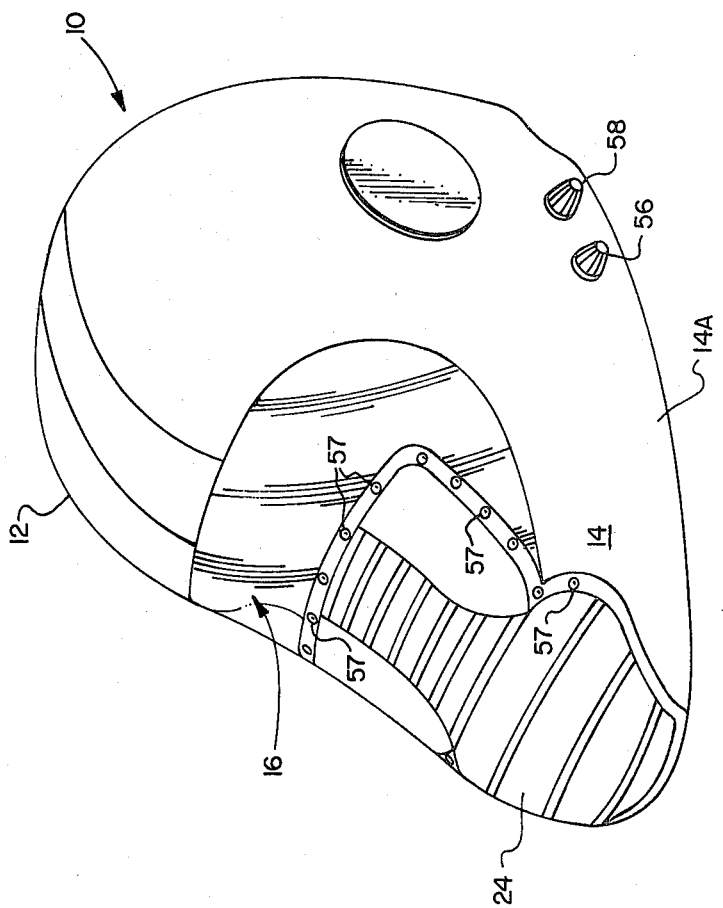
FIG. 1 is a perspective view of a toy space helmet constructed according to the teachings of the present invention.

In the description which follows, like parts are marked throughout the specification and drawings with the same reference numerals, respectively. The drawings are not necessarily to scale and in some instances portions have been exaggerated in order to more clearly depict certain features of the invention.

Figure 2:
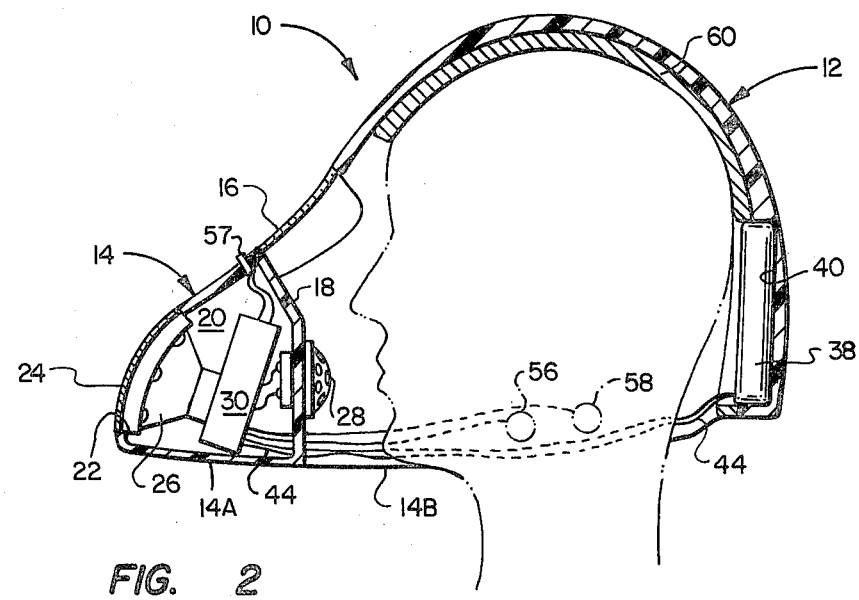
FIG. 2 is a left side elevation view, partially in section, of the helmet shown in FIG. 1.

Referring now to FIGS. 1 and 2, the toy space helmet of the present invention is indicated generally by the reference numeral 10. The helmet 10 is constructed of a light-weight plastic material by an injection molding process. The helmet 10 includes a head covering portion 12 and a forwardly projecting nose housing 14. Disposed between the nose housing and the head covering portion is a wrap-around viewing shield 16. The viewing shield 16 may be transparent or translucent as desired, and is made of a durable plastic material.

The interior of the helmet 10 is partitioned by a folded sidewall baffle 18 which, in combination with the nose housing 14, encloses a speaker chamber 20. The nose housing 14 is provided with a port opening 22 on the forwardmost portion of the nose housing. The port opening 22 is covered by a protective grill 24.

Received within the chamber 20 is a loud speaker 26. The loud speaker 26 is mounted in alignment with the port opening 22 onto the surrounding nose housing 14.

Mounted on the exterior of the rear wall of the baffle 18 is a microphone 28. The microphone 28 is conveniently positioned immediately forward of the wearer's face, and in normal use, does not come in contact with the wearer. The speaker chamber 20 is completely enclosed by the baffle 18, and the microphone 28 is further shielded to prevent audio feedback by the surrounding sidewall portions 14A, 14B.

Figure 3:
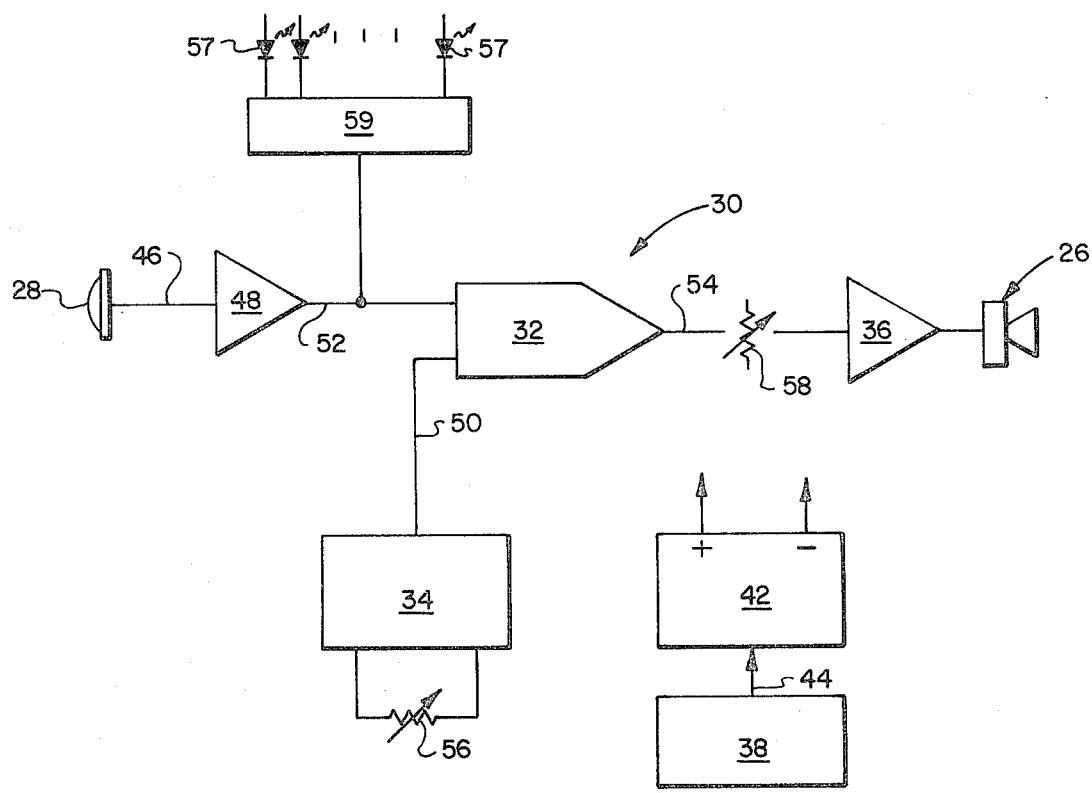
FIG. 3 is a block diagram of the voice alteration unit contained in the helmet shown in FIG. 1.

Enclosed within the chamber 20 is a voice alteration unit 30. The major components of the voice alteration unit 30, as indicated in FIG. 3, are an analog multiplier 32, a sine wave oscillator 34 and an audio amplifier 36.

The analog multiplier 32 receives operating power from a battery pack 38. The battery pack 38 preferably comprises one or more batteries and is lodged within a pocket 40 formed within the rear of the head covering portion 12. The battery pack is connected electrically to a regulator 42 which maintains the operating voltage at a predetermined level.

The battery pack 38 is located in the rear of the helmet 12 as indicated in FIG. 2 to counterbalance the forwardly projecting nose housing and the associated voice alteration components. A pair of power conductors 44 is routed from the battery pack 38 along the sidewall of the helmet through the baffle 18 and into the speaker chamber 20 for connection to the voice alteration unit. The regulator 42 is preferably incorporated within the voice alteration unit 30.

In operation, the microphone 28 develops an audio signal 46 which forms an input to a pre-amplifier 48. At the same time, the sine wave oscillator 34 is producing a sine wave output signal 50 which forms one input of the multiplier 32. A second input to the multiplier 32 is formed by the output 52 of the pre-amp 48. The analog multiplier 32 electronically derives current signals which correspond in amplitude with the logarithm of the signal waveforms forming the inputs 50, 52. The analog multiplier 32 also derives the anti-logarithm of the sum of the two logarithmic signals. Thus, the output signal 54 corresponds with the product of the sine wave signal 50 and the amplified voice signal 52.

The product of the voice signal 52 with the sine wave signal 50 produces a special effect which simulates an alien voice. The multiplier output signal 54 contains algebraic sum and difference components of the two input waveforms, but none of the original input waveforms themselves. Thus, the voice is altered considerably by this arrangement.

Preferably, the frequency of the sine wave oscillator 34 is adjustable by a variable resistor 56. Additionally, the output volume is also adjustable by a variable resistor 58.

By this arrangement, the frequency components of the input signals are thus shifted from their normal values, with the speech portion of the output waveform being intelligible. By adjusting the frequency of the sine wave generator 34, many unique and interesting variations can be obtained.

The multiplier 32 is adjusted to have zero output with the voice signal 52 developed by the pre-amp 48 being at zero level. Otherwise, the sine wave signal 50 would be reproduced continuously by the loud speaker 26. Properly adjusted, there is no audible output from the loud speaker 26 unless there is an audio signal produced by the microphone 28.

It will be appreciated that the acoustical properties of the helmet and of the speaker enclosure are not ideal and that care must be exercised in the placement of the components to eliminate feedback and to compensate for low frequency loss. Feedback problems are minimized by placing the microphone on the outside of the speaker enclosure baffle 18 and by the shielding effect of the surrounding helmet sidewall portions 14A, 14B.

An interesting visual effect is provided by an array of light emitting diodes 57 which are arranged in a symmetrical pattern on the nose housing 14. Preferably, the light emitting diodes 57 are modulated by the amplified audio signal 52. In the present arrangement, symmetrical combinations of light emitting diodes are illuminated according to the intensity of the audio signal 52, with only a few light emitting diodes being illuminated for low voice levels, and all of the light emitting diodes being illuminated for relatively high voice levels. The various light emitting diode combinations are selected by a driver unit 59. The array of light emitting diodes 57 are thus arranged to provide an interesting visual effect which corresponds with the amplified voice signal.

The helmet 10 is fitted internally with a layer of padding 60 to accommodate different head sizes. Alternatively, an adjustable band (not shown) can be attached to the interior of the helmet 10 for accommodating different head sizes, from children to young adult sizes.

Although a preferred embodiment of the invention has been described in detail, it should be understood that various changes, substitutions and alterations can be made therein without departing from the spirit and scope of the invention as defined by the appended claims.

What is claimed is:

1. A toy space helmet comprising, in combination:

a helmet having a head covering portion, a forwardly projecting nose housing and a viewing shield connected between said head covering portion and said nose housing;

said nose housing having a loudspeaker port opening and having a sidewall baffle portion enclosing a chamber behind said port opening;

a loudspeaker mounted on said nose housing and received within said chamber in alignment with said port opening;

a microphone for producing an audio signal mounted on said baffle externally of said chamber;

a voice alteration unit received within said chamber having an input coupled to said microphone and an output coupled to said loudspeaker, said voice alteration unit including an oscillator for producing a periodic signal, a multiplier having a first input coupled to said microphone for receiving said voice signal, a second input coupled to said oscillator for receiving said periodic signal and having an audio output corresponding to the product of said voice signal and said periodic signal, and an audio amplifier having an input coupled to said multiplier output and having an output coupled to said loudspeaker; and, a battery pack including one or more batteries lodged in said head covering portion and electrically coupled to said voice alteration unit for providing operating power.

* * * * *